United States Patent
Teal et al.

(10) Patent No.: US 11,077,950 B2
(45) Date of Patent: Aug. 3, 2021

(54) ARM RESTRAINT LATCH RELEASE ASSEMBLY

(71) Applicant: AMI Industries, Inc., Colorado Springs, CO (US)

(72) Inventors: Cyle Teal, Colorado Springs, CO (US); Bradley Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 264 days.

(21) Appl. No.: 16/422,528

(22) Filed: May 24, 2019

(65) Prior Publication Data

US 2020/0369392 A1 Nov. 26, 2020

(51) Int. Cl.
*B64D 25/10* (2006.01)

(52) U.S. Cl.
CPC .................... *B64D 25/10* (2013.01)

(58) Field of Classification Search
CPC ..................................................... B64D 25/10
See application file for complete search history.

(56) References Cited

U.S. PATENT DOCUMENTS

| | | | |
|---|---|---|---|
| 2,820,602 A | 1/1958 | Foster | |
| 3,880,387 A | 4/1975 | Martin | |
| 4,081,156 A * | 3/1978 | Ideskar | B64D 25/02 244/122 AG |
| 4,215,835 A | 8/1980 | Wedgwood | |
| 4,462,563 A | 7/1984 | Specker et al. | |
| 4,508,294 A * | 4/1985 | Lorch | B64D 25/02 244/122 AG |
| 4,592,523 A * | 6/1986 | Herndon | B64D 25/02 244/122 AG |
| 4,667,902 A * | 5/1987 | Zenobi | B64D 25/02 244/122 A |
| 5,301,903 A * | 4/1994 | Aronne | B64D 25/02 244/122 AG |
| 5,301,904 A | 4/1994 | Guill | |
| 5,415,366 A * | 5/1995 | Mastrolia | B64D 25/02 244/122 AG |
| 6,315,245 B1 * | 11/2001 | Ruff | B64D 25/02 244/122 AG |
| 8,485,471 B2 * | 7/2013 | Patterson | B64D 25/10 244/122 AG |
| 2011/0114790 A1 * | 5/2011 | Patterson | B64D 25/02 244/122 AG |

* cited by examiner

*Primary Examiner* — Justin M Benedik
(74) *Attorney, Agent, or Firm* — Snell & Wilmer L.L.P.

(57) ABSTRACT

An arm restraint assembly for an ejection seat may comprise a primary arm configured to pivot about a primary arm pivot joint. A latch may be coupled to the primary arm. The latch may comprise a first pair of lugs and may be configured to pivot relative to the primary arm. A primary shear pin may extend between the first pair of lugs. A lanyard may be coupled to the primary shear pin.

20 Claims, 7 Drawing Sheets

ARM RESTRAINT LATCH RELEASE ASSEMBLY

FIELD

The present disclosure relates to ejection seats, and more specifically, to ejection seat arm restraint assemblies having latch release assemblies.

BACKGROUND

Ejection systems are designed to expel pilots from an aircraft cockpit. Upon ejection from the cockpit, the pilot enters the wind stream at the surface of the aircraft canopy. The pressure imposed on the pilot upon entering the wind stream (i.e., during windblast) acts to move the pilot's arms rearward. Current ejection seats may include limb restraint systems configured to reduce or prevent limb flail injuries during the ejection sequence.

SUMMARY

An arm restraint assembly for an ejection seat is disclosed herein. In accordance with various embodiments, the arm restraint assembly may comprise a primary arm configured to pivot about a primary arm pivot joint, a latch, a primary shear pin, and a lanyard. The latch may be coupled to the primary arm. The latch may comprise a first pair of lugs. The latch may be configured to pivot relative to the primary arm. The primary shear pin may extend between the first pair of lugs. The lanyard may be coupled to the primary shear pin.

In various embodiments, a netting may be coupled to the primary arm. In various embodiments, a secondary arm may be coupled to the netting. The secondary arm may be configured to pivot about a secondary arm pivot joint.

In various embodiments, the secondary arm may define a secondary orifice. In a non-deployed position, a hook portion of the latch may be located through the secondary orifice.

In various embodiments, a secondary shear pin may be coupled to a second pair of lugs of the latch. In various embodiments, the secondary shear pin may be designed to shear at a first minimum shear load, and the primary shear pin may be designed to shear at a second minimum shear load. The second minimum shear load may be greater than the first minimum shear load.

In various embodiments, a lock assembly may be coupled to the primary arm. The lock assembly may be configured to restrict rotation of the primary arm. In various embodiments, a primary arm bracket may be coupled to the primary arm. The lock assembly may comprise a tab coupled to the primary arm and biased toward the primary arm bracket. The primary arm bracket may define a groove configured to receive the tab in response to the primary arm rotating a predetermined number of degrees.

An ejection seat is also disclosed herein. In accordance with various embodiments, the ejection seat may comprise a seat back and an arm restraint assembly coupled to the seat back. The arm restraint assembly may comprise a primary arm configured to pivot relative to the seat back, a latch, a primary shear pin, and a lanyard. The latch may be coupled to the primary arm. The latch may comprise a first pair of lugs. The primary shear pin may extend between the first pair of lugs. The lanyard may be coupled to the primary shear pin.

In various embodiments, the arm restraint assembly may further comprise a secondary arm. In a non-deployed position, the secondary arm may be located between the primary arm and the seat back.

In various embodiments, the secondary arm may define a secondary orifice. In the non-deployed position, a portion of the latch may be located through the secondary orifice.

In various embodiments, the arm restraint assembly may further comprise a secondary shear pin extending between a second pair of lugs of the latch. In various embodiments, the second pair of lugs may extend from a surface of the latch. In a non-deployed position, the lanyard may be located between the secondary shear pin and the surface of the latch.

In various embodiments, the latch may further comprise a leg configured to limit a rotation of the latch relative to the primary arm.

In various embodiments, the arm restraint assembly may further comprise a lock assembly coupled to the primary arm. The lock assembly may be configured to restrict rotation of the primary arm. In various embodiments, the arm restraint assembly may further comprise a primary arm bracket coupled to the primary arm. The lock assembly may comprise a tab coupled to the primary arm. The primary arm bracket may define a groove configured to receive the tab in response to the primary arm rotating a predetermined number of degrees.

An arm restraint assembly configured to deploy in response to expulsion of an ejection seat from a cockpit is also disclosed herein. In accordance with various embodiments, the arm restraint assembly may comprise a left arm restraint and a right arm restraint. The left arm restraint and the right arm restraint may each comprise a primary arm configured to pivot to a fully-deployed position within the cockpit, a latch, and a primary shear pin. The latch may be coupled to the primary arm. The latch may comprise a first pair of lugs. The primary shear pin may extend between the first pair of lugs.

In various embodiments, the left arm restraint and the right arm restraint may each further comprise a lanyard coupled to the primary shear pin. In various embodiments, the left arm restraint and the right arm restraint may each further comprise a secondary shear pin extending between a second pair of lugs of the latch.

In various embodiments, the left arm restraint and the right arm restraint may each further comprise a secondary arm. In a non-deployed position, a portion of the latch may be located through a secondary orifice defined by the secondary arm.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
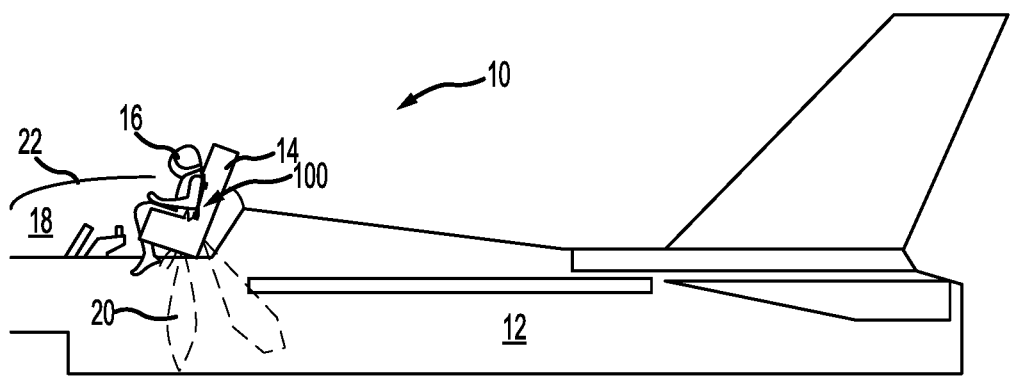
FIG. 1A illustrates an ejection seat being launched from an aircraft cockpit, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20.

In accordance with various embodiments, ejection seat 14 includes an arm restraint assembly 100. Arm restraint assembly 100 may be configured to deploy while the arms of occupant 16 are located within cockpit 18. Stated differently, ejection system 10 may cause arm restraint assembly 100 to deploy prior to the arms of occupant 16 entering the wind stream outside of cockpit 18 (i.e., outside a canopy 22 of aircraft 12). Arm restraint assembly 100 is configured to limit rearward movement of the arms of occupant 16. Stated differently, in a deployed state, arm restraint assembly 100 may limit the arms of occupant 16 from moving aftward or toward the tail end of aircraft 12 (i.e., in the positive Z-direction on the provided XYZ axes).

As described herein, arm restraint assembly 100 may include a latch including one or more shear pins. The latch and shear pins may be designed to prevent or reduce rotation of the arms of arm restraint assembly 100 in the stowed, or non-deployed, position and to transfer moment to a primary arm of arm restraint assembly 100, thereby causing arm restraint assembly 100 to deploy. In various embodiments, the shear pin(s) may be configured to fail at predetermined loads. In various embodiments, a primary shear pin couples an arm restraint lanyard to the latch. The primary shear pin may be designed to fail (i.e., shear) at a load greater than the loads anticipated during deployment of arm restraint assembly 100. In various embodiments, a secondary shear pin may restrain the lanyard when arm restraint assembly 100 is in the stowed configuration. The secondary shear pin may be configured to shear at a load less than the primary shear pin.

Figure 1B:
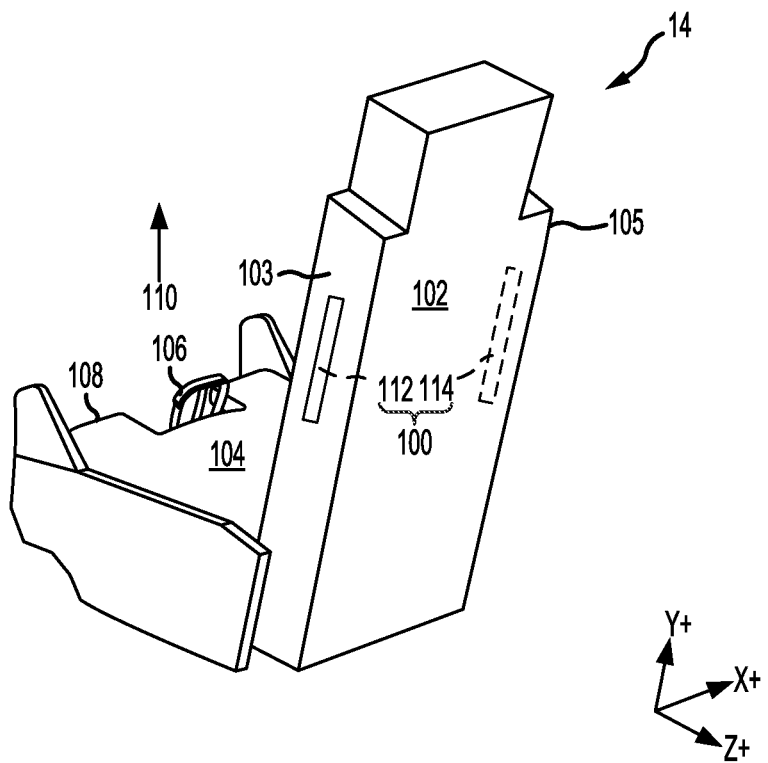
FIG. 1B illustrates a perspective view of an ejection seat, in accordance with various embodiments.

With reference to FIG. 1B, ejection seat 14 is illustrated with arm restraint assembly 100 in a non-deployed position, in accordance with various embodiments. Ejection seat 14 includes a seat back 102 and a seat pan 104. In various embodiments, an ejection handle 106 may be located proximate a front side 108 of seat pan 104. Frontside 108 of seat pan 104 is generally opposite, or distal, seat back 102. While FIG. 1B shows ejection handle 106 located at frontside 108 of seat pan 104, it is further contemplated and understood that ejection handle 106 may be located anywhere that is accessible to an occupant of ejection seat 14. Ejection handle 106 may be configured to initiate an ejection sequence upon actuation. For example, occupant 16 (with momentary reference to FIG. 1A) pulling ejection handle 106 in the direction of arrow 110 by may cause ejection seat 14 to be expelled from cockpit 18.

Ejection seat 14 includes arm restraint assembly 100. Arm restraint assembly 100 may include a left (or first) arm restraint 112 and a right (or second) arm restraint 114. Left and right arm restraints 112, 114 may be located at opposing sides of seat back 102. Left arm restraint 112 may be located proximate a left side panel 103 of seat back 102. Right arm restraint 114 may be located proximate a right side panel 105 of seat back 102. As described in further detail below, left and right arm restraints 112, 114 may include arms, or struts, configured to pivot relative to seat back 102. Upon initiation of the ejection sequence, the arms of left and right arm restraints 112, 114 pivot, or otherwise rotate, to a fully-deployed position.

Figure 2A:
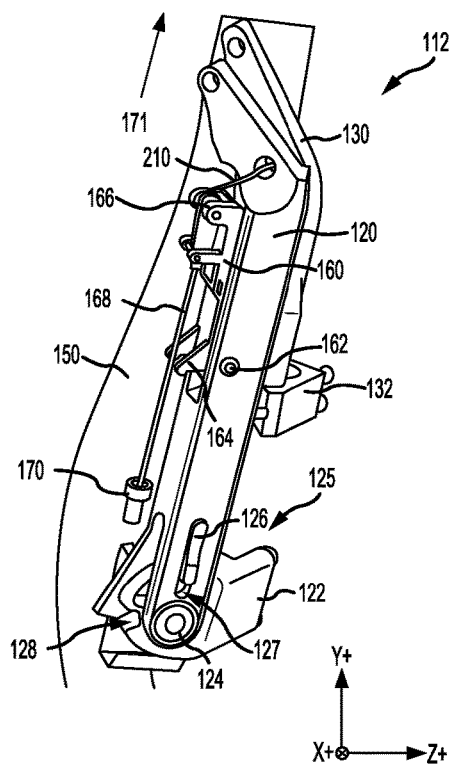
FIGS. 2A and 2B illustrate perspective views of an arm restraint assembly in a non-deployed position, in accordance with various embodiments.
Figure 2B:
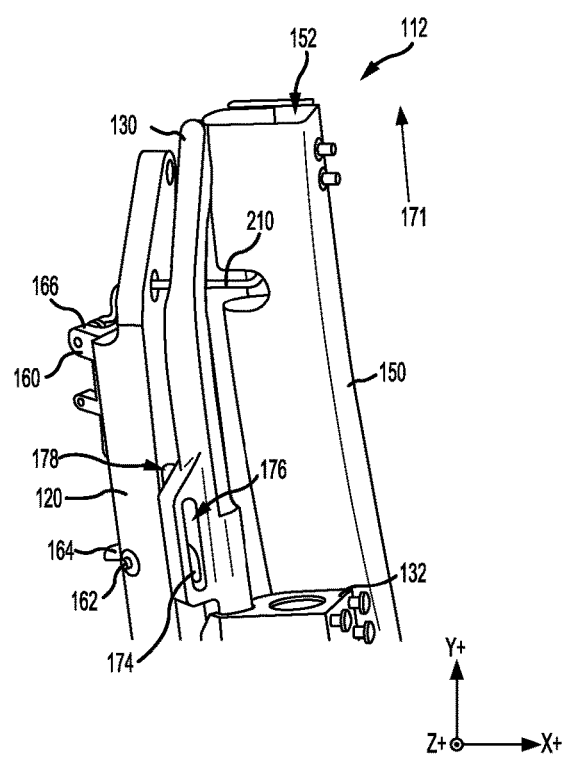

With reference to FIGS. 2A and 2B, and continuing reference to FIG. 1B, left arm restraint 112 is illustrated in a non-deployed position, in accordance with various embodiments. While elements and functionalities of left arm restraint 112 are described in relation to FIGS. 2A, 2B, 3A, 3B, 4A, 4B, 5A, 5B, and 5C, it is further contemplated and understood that right arm restraint 114 is a mirror image of left arm restraint 112 and includes the elements and functionalities as described herein with respect to left arm restraint 112.

Left arm restraint 112 includes a primary (or first) arm 120. In various embodiments, left arm restraint 112 may include a secondary (or second) arm 130. In the non-deployed position, secondary arm 130 may be located between primary arm 120 and a net cover 150. Net cover 150 may form a portion of seat back 102 (FIG. 1B) and/or may be otherwise be attached to seat back 102. In response to deployment of ejection seat 14, primary arm 120 and secondary arm 130 pivot relative to left side panel 103 (FIG. 1B) of seat back 102. Primary arm 120 is coupled, or otherwise attached, to seat back 102 (e.g., to left side panel 103) via a primary arm bracket 122. Primary arm bracket 122 is attached to seat back 102 via pins, rivets, screws, clips, or any other securement device. Secondary arm 130 is coupled or otherwise attached to seat back 102 (e.g., to left side panel 103) via a secondary arm bracket 132. Secondary arm bracket 132 is attached to seat back 102 via pins, rivets, screws, clips, or any other securement device. In various embodiments, primary arm bracket 122 and secondary arm bracket 132 are static structures, which do not pivot or otherwise rotate relative to seat back 102.

Primary arm 120 may be rotationally coupled to primary arm bracket 122 via a primary arm pivot joint 124. During deployment of left arm restraint 112, Primary arm 120 rotates relative to primary arm bracket 122 and about primary arm pivot joint 124. Secondary arm 130 may be rotationally coupled to secondary arm bracket 132 via a secondary arm pivot joint 134, with momentary reference to FIG. 5B. During the deployment of left arm restraint 112, secondary arm 130 rotates relative to secondary arm bracket 132 and about the secondary arm pivot joint 134. In various embodiments, the axis of rotation about which primary arm 120 rotates is not parallel to the axis of rotation about which secondary arm 130 rotates.

In various embodiments, primary arm 120 may include a lock assembly 125. Lock assembly 125 may be configured to lock primary arm 120 in the fully-deployed position. Lock assembly 125 is configured to limit a rotation of primary arm 120. For example, lock assembly 125 may be configured such that in response to the primary arm 120 rotating a predetermined number of degrees (e.g., 90°), lock assembly 125 prevents, or otherwise blocks, further rotation of primary arm 120 and prevents, or otherwise blocks, primary arm 120 from rotating in the opposite direction (i.e., toward secondary arm 130 and left side panel 103 of seat back 102). In various embodiments, lock assembly 125 may include a tab 126 coupled to primary arm 120. In various embodiments, tab 126 may be located in an orifice 127 defined by primary arm 120. Tab 126 is biased in a radially inward direction. Stated differently, tab 126 is biased toward primary arm pivot joint 124. Primary arm bracket 122 may define a groove 128. Groove 128 is configured to receive tab 126. Locating tab 126 in groove 128 generates an interference between tab 126 and primary arm bracket 122 that restricts or otherwise prevents rotation of primary arm 120 about primary arm pivot joint 124. In various embodiments, a location of groove 128 in primary arm bracket 122 may be selected such that tab 126 will translate into groove 128 when primary arm 120 has rotated a predetermined number of degrees (e.g., 75°, 90°, 100°, etc.).

In accordance with various embodiments, left arm restraint 112 includes a latch 160. Latch 160 is rotationally coupled to primary arm 120 via a latch pivot joint 162. Latch 160 may rotate, relative to primary arm 120, via latch pivot joint 162. A lanyard, or cord, 168 may be attached to a head end 166 of latch 160 and to an anchor, or coupling, 170.

With combined reference to FIG. 1A and FIG. 2A, anchor 170 is coupled, or otherwise attached, to a stationary structure (e.g., a seat rail, a wall, a floor, etc.) within cockpit 18. In this regard, during expulsion of ejection seat 14 from cockpit 18, ejection seat 14 translates toward canopy 22 (i.e., in the direction of arrow 171 in FIG. 2A), while anchor 170 remains stationary. As ejection seat 14 travels toward canopy 22, the coupling of lanyard 168 between latch 160 and anchor 170 causes latch 160 to rotate about latch pivot joint 162.

Figure 3A:
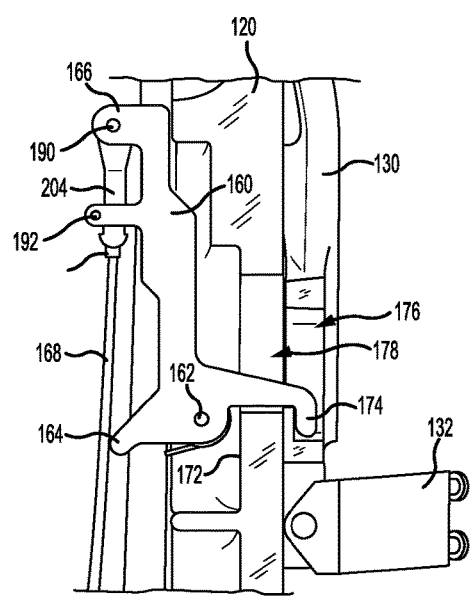
FIG. 3A illustrates a perspective view of a latch of an arm restraint assembly, with the arm restraint assembly in a non-deployed position, in accordance with various embodiments.
Figure 3B:
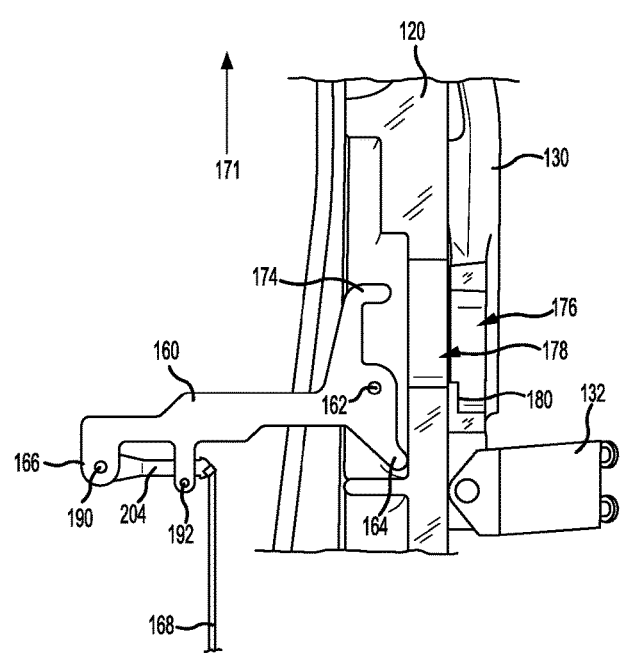
FIG. 3B illustrates a perspective view of a latch of an arm restraint assembly, with the latch in a deployment position prior to shear of a secondary shear pin, in accordance with various embodiments.

With reference to FIGS. 3A and 3B, latch 160 may include one or more leg(s) 164. In the non-deployed position, legs 164 may extend away from primary arm 120. As primary arm 120 rotates about latch pivot joint 162, a head end 166 of latch 160 may rotate away from primary arm 120 while legs 164 rotate toward primary arm 120. Head end 166 of latch 160 may be located opposite, or distal, latch pivot joint 162 and legs 164.

In various embodiments, latch 160 may include a hook portion 174. Hook portion 174 may be located approximately 90°, about latch pivot joint 162, from head end 166 of latch 160. Hook portion 174 may be located approximately 180°, about latch pivot joint 162, from legs 164. In various embodiments, secondary arm 130 may define a secondary latch orifice 176 configured to receive hook portion 174. Primary arm 120 may define a primary latch orifice 178. In the non-deployed position, primary latch orifice 178 may be aligned with secondary latch orifice 176 and hook portion 174 of latch 160 may be located through primary latch orifice 178 and secondary latch orifice 176. When left arm restraint 112 is in the non-deployed position, hook portion 174 may engage, or contact, a secondary interference surface 180 (FIG. 3B) of secondary arm 130. Hook portion 174 contacting secondary interference surface 180 may secure primary arm 120 to secondary arm 130. Stated differently, an interference generated between hook portion 174 and secondary interference surface 180 may block and/or prevent rotation of primary arm 120 and secondary arm 130 away from seat back 102 (FIG. 1B).

In various embodiments, as latch 160 rotates about latch pivot joint 162, hook portion 174 rotates out secondary latch orifice 176 and primary latch orifice 178, thereby allowing primary arm 120 to separate from (i.e., rotate away from) secondary arm 130. Latch 160 rotates about latch pivot joint 162 until legs 164 contact an interference surface 172 (FIG. 3A) of primary arm 120. Legs 164 contacting interference surface 172 creates an interference that prevents further rotation of latch 160.

In accordance with various embodiments, a primary shear pin 190 may be coupled to latch 160. A terminal end 204 of lanyard 168 may be coupled to primary shear pin 190. In various embodiments, a secondary shear pin 192 may be coupled to latch 160. Secondary shear pin 192 may be configured to restrict movement of lanyard 168, when arm restraint assembly 100 is in the non-deployed position.

Figure 4A:
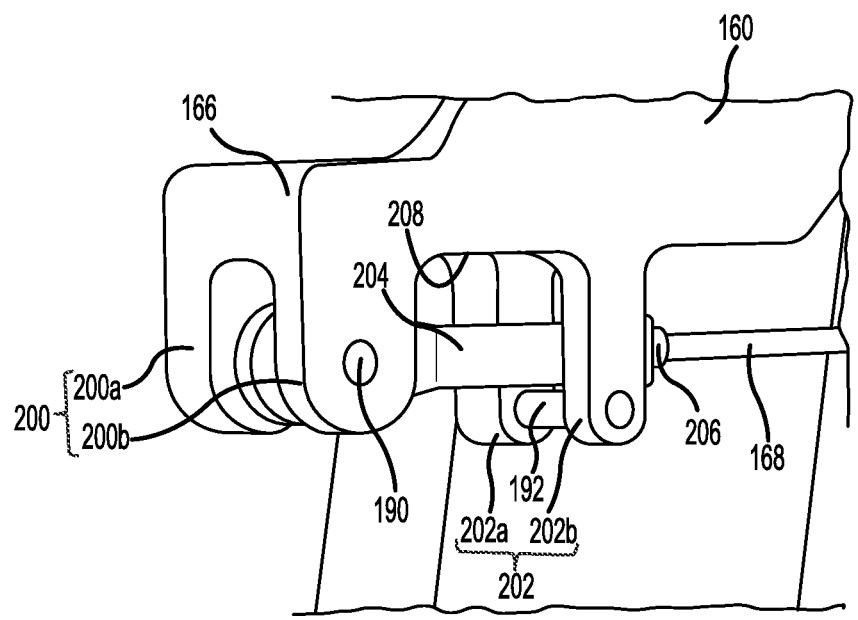
FIGS. 4A and 4B illustrates a terminal end of a lanyard of an arm restraint assembly, in accordance with various embodiments.
Figure 4B:
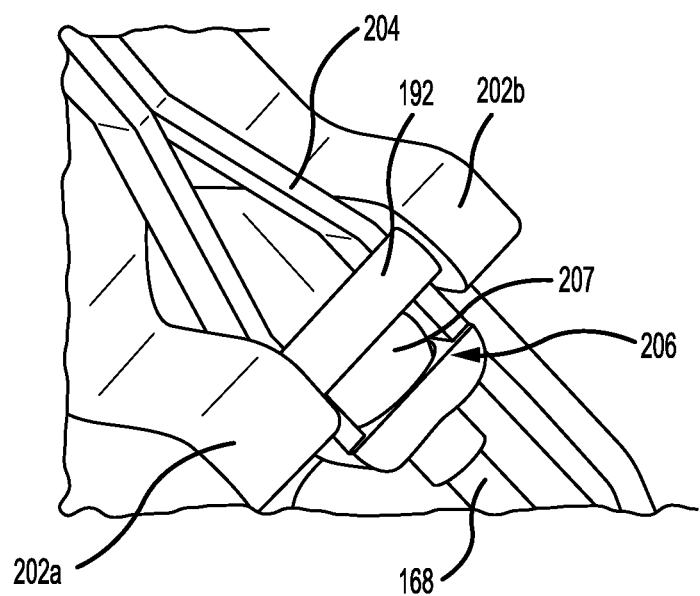

With reference to FIGS. 4A and 4B, additional details of latch 160 and primary and secondary shear pins 190, 192 are illustrated, in accordance with various embodiments. In various embodiments, primary shear pin 190 may extend between a first pair of lugs 200 of latch 160. Stated differently, primary shear pin 190 may be coupled to a first primary lug 200a and a second primary lug 200b of latch 160. In various embodiments, the first pair of lugs 200 (i.e., first primary lug 200*a* and second primary lug 200*b*) extend from a surface 208 of latch 160. Terminal end 204 of lanyard 168 is attached to primary shear pin 190. In various embodiments, primary shear pin 190 may be located through terminal end 204 of lanyard 168.

In various embodiments, secondary shear pin 192 may extend between a second pair of lugs 202 of latch 160. Stated differently, secondary shear pin 192 may be coupled to a first secondary lug 202*a* and a second secondary lug 202*b* of latch 160. In various embodiments, the second pair of lugs 202 (i.e., first secondary lug 202*a* and second secondary lug 202*b*) extend from surface 208 of latch 160. In the non-deployed position, secondary shear pin 192 may restrict movement of terminal end 204. In this regard, in the non-deployed position, terminal end 204 of lanyard 168 may be located between secondary shear pin 192 and surface 208 of latch 160.

In various embodiments, terminal end 204 may comprise a ball and socket joint 206. Ball and socket joint 206 may comprise a spherically-shaped portion 207 of lanyard 168 located within a socket (i.e., orifice) defined by terminal end 204. Ball and socket joint 206 may allow multidirectional movement and rotation of lanyard 168 relative to terminal end 204 and to latch 160.

Returning to FIGS. 3A and 3B, as the ejection seat translates in the direction of arrow 171, terminal end 204 pivots about primary shear pin 190 and contacts secondary shear pin 192. Terminal end 204 of lanyard 168 applies a load to secondary shear pin 192 and latch 160. The load applied to secondary shear pin 192 and latch 160 causes latch 160 to rotate about latch pivot joint 162. Latch 160 rotates about latch pivot joint 162 until legs 164 contact interference surface 172 of primary arm 120. The interference between legs 164 and interference surface 172 increases the load applied to secondary shear pin 192. Secondary shear pin 192 is configured to shear at a predetermined minimum shear load (i.e., loads equal to or greater than the predetermined minimum shear load cause secondary shear pin 192 to break). When the load applied by terminal end 204 of lanyard 168 exceeds the predetermined minimum shear load of secondary shear pin 192, secondary shear pin 192 shears, thereby removing secondary shear pin 192 from the path of terminal end 204 of lanyard 168.

Figure 5A:
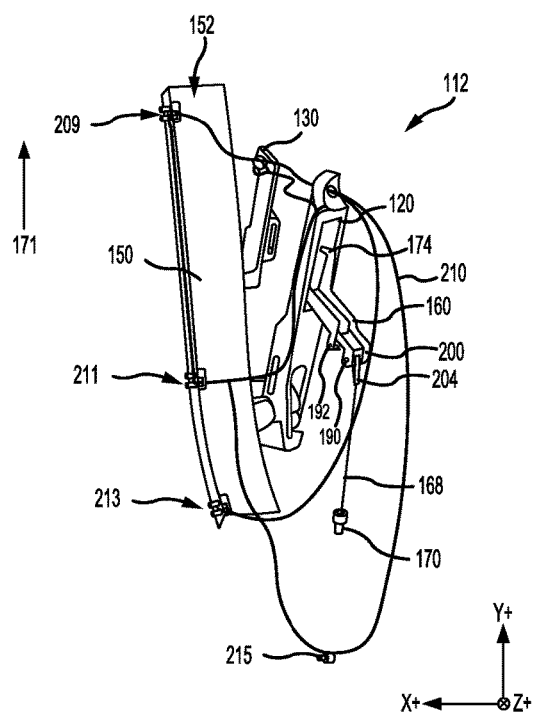
FIGS. 5A and 5B illustrate an arm restraint assembly in a partially-deployed position after shear of a secondary shear pin, in accordance with various embodiments.
Figure 5B:
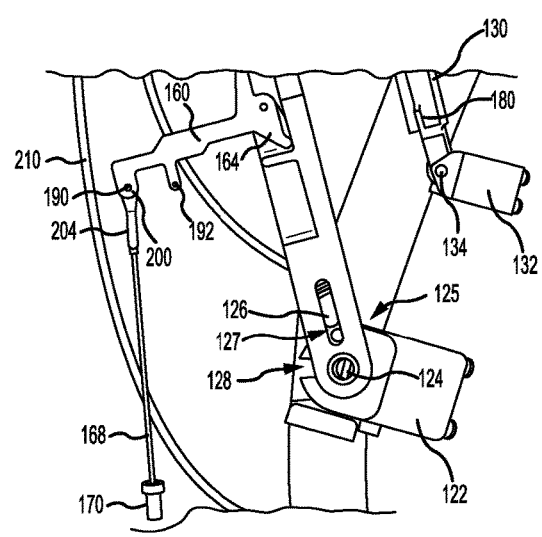

With reference to FIGS. 5A and 5B, left arm restraint 112 is illustrated in a partially-deployed position, after shear of secondary shear pin 192. After secondary shear pin 192 shears, terminal end 204 of lanyard 168 rotates about primary shear pin 190 and the load from lanyard 168 is applied to primary shear pin 190 and the first pair of lugs 200. The load from lanyard 168 along with the interference between legs 164 of latch 160 and interference surface 172 causes primary arm 120 to rotate about primary arm pivot joint 124. Primary arm 120 rotates about primary arm pivot joint 124 until tab 126 translates into groove 128, thereby restricting further rotation of primary arm 120.

With combined reference to FIG. 5A, left arm restraint 112 further includes a netting 210. Netting 210 may be coupled to primary arm 120. Netting 210 may comprise rope, ribbon, webbing, string, etc. Netting 210 may be formed from polyaramid paraphenylene terephthalamide (PPTA), nylon, ballistic nylon, polypropylene, polyester, cotton, metal, metal alloy, or other suitable material. In the non-deployed position, netting 210 is located within a net cover 150 (i.e., proximate left side panel 103 of seat back 102, with momentary reference to FIG. 1B). In various embodiments, net cover 150 may define a channel 152. Channel 152 may house portions of netting 210 prior to deployment of left arm restraint 112.

As primary arm 120 rotates about primary arm pivot joint 124, netting 210 is drawn out channel 152 and away from net cover 150. In various embodiments, a portion of netting 210 may be coupled to secondary arm 130. As primary arm 120 rotates away from net cover 150 and seat back 102 (FIG. 1B), netting 210 may force secondary arm 130 to rotate away from net cover 150 and seat back 102.

Figure 5C:
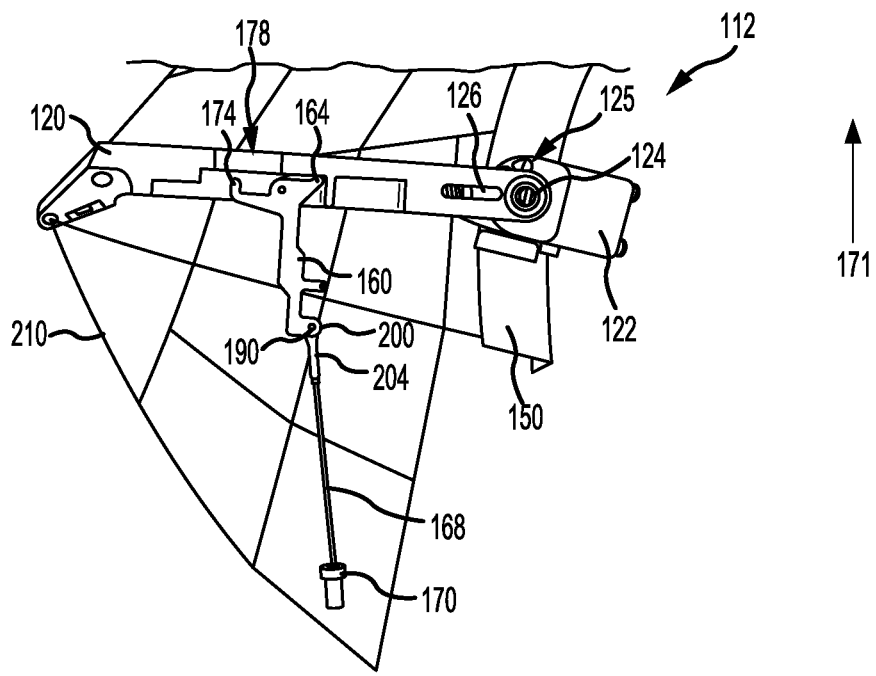
FIG. 5C illustrates an arm restraint assembly in a fully-deployed position prior to shear of a primary shear pin, in accordance with various embodiments.

FIG. 5C illustrates left arm restraint 112 in a fully-deployed position, prior to shear of primary shear pin 190. In the fully-deployed position, tab 126 is located within groove 128 (FIG. 5B). Locating tab 126 within groove 128 prevents primary arm 120 from rotating about primary arm pivot joint 124. In the fully-deployed position, the load applied to primary shear pin 190 by lanyard 168 increases due to the ejection seat continuing to translate in the direction of arrow 171 (i.e., away from anchor 170) and the rotation of primary arm 120 being restricted. The load applied by lanyard 168 will continue to increase until the load exceeds the minimum load of primary shear pin 190, at which point primary shear pin 190 will break, thereby releasing (i.e., uncoupling) latch 160 and primary arm 120 from lanyard 168 and anchor 170.

Figure 6:
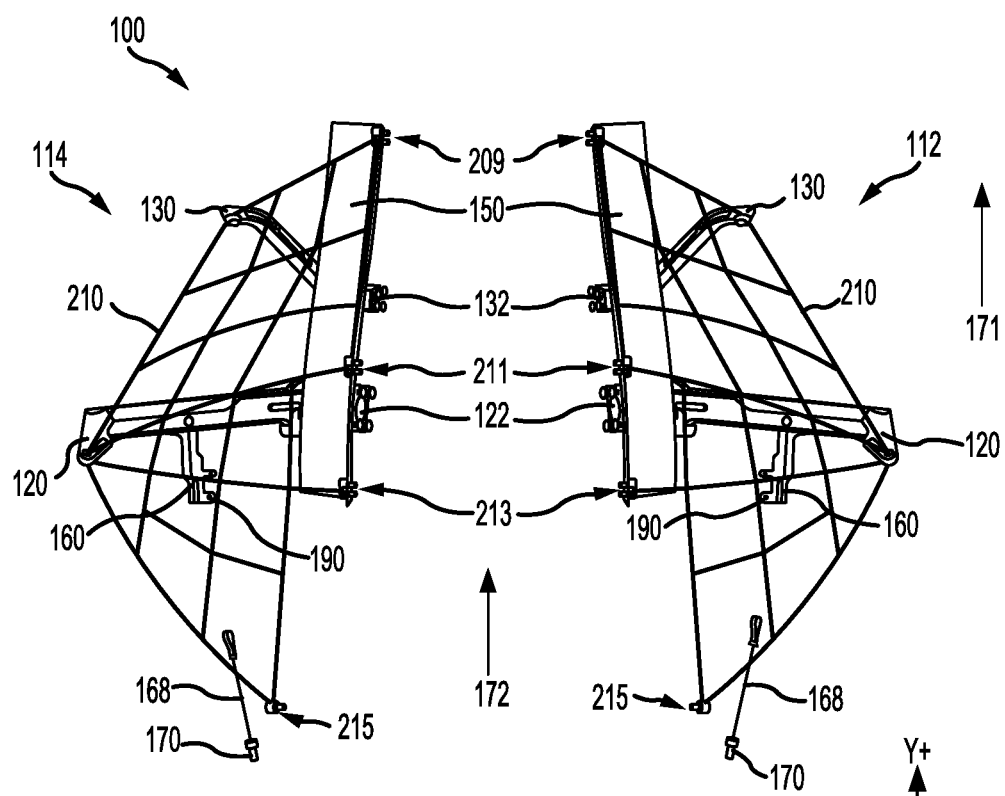
FIG. 6 illustrates an arm restraint assembly in a fully-deployed state after shear of a primary shear pin, in accordance with various embodiments.

FIG. 6 shows arm restraint assembly 100 with left and right arm restraints 112, 114 in the fully-deployed position after shear of primary shear pins 190, in accordance with various embodiments. Seat back 102 and seat pan 104 have been removed from FIG. 6 for clarity and to illustrate the features of arm restraint assembly 100. With lock assembly 125 restricting further rotation of primary arm 120 and the ejection seat continuing to translate in the direction of arrow 171, the load exerted by lanyard 168 causes primary shear pin 190 to break (i.e., shear). Stated differently, primary shear pin 190 shears when the load applied by lanyard 168 exceeds the minimum shear load of primary shear pin 190.

With momentary reference to FIG. 4A, in various embodiments, secondary shear pin 192 is configured to shear at a first minimum shear load (i.e., loads equal to or greater than the first minimum shear load cause secondary shear pin 192 to break), and primary shear pin 190 is configured to shear at a second minimum shear load (i.e., loads equal to or greater than the second minimum shear load cause primary shear pin 190 to break). In various embodiments, the second minimum shear load is greater than the first minimum shear load.

Returning to FIG. 6, in the fully-deployed position, netting 210 is drawn taut between primary arm 120 and one or more netting brackets, for example, via netting brackets 209, 211, 213, 215. In various embodiments, netting 210 may be coupled or otherwise attached to ejection seat 14 via netting brackets 209, 211, 213, 215. In various embodiments, netting brackets 209, 211, 213 may be attached to seat back 102, with momentary reference to FIG. 1B, and netting bracket 215 may be attached to seat pan 104. Netting brackets 209, 211, 213, 215 may be attached to ejection seat 14 via pins, rivets, screws, clips, or any other securement device. In the fully-deployed position, netting 210 may restrict rearward arm movement of the arms of occupant 16, with momentary reference to FIG. 1A.

With combined reference to FIG. 1A and FIG. 6, the configuration of latch 160 and primary and secondary shear pins 190, 192 may allow arm restraint assembly 100 to quickly and easily deploy within cockpit 18. Deploying arm restraint assembly 100 within cockpit 18 increases a probability that arm restraint assembly 100 will be available to support and restrain the arms of occupant 16 when entering windblast.

Figure 7:
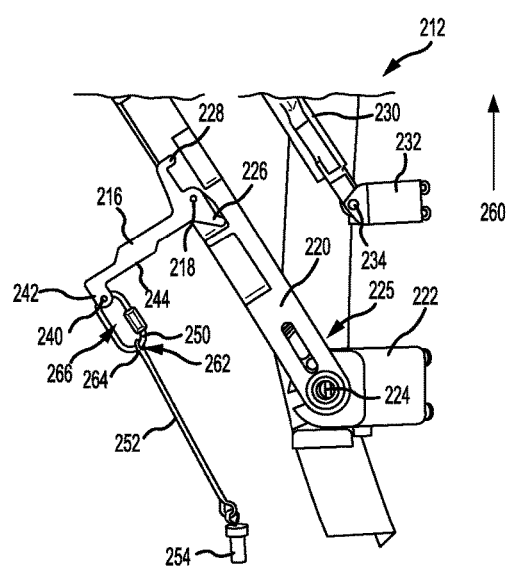
FIG. 7 illustrates an arm restraint in a partially-deployed state with a coupling attached between a lanyard and a latch of the arm restraint, in accordance with various embodiments.

With reference to FIG. 7, an arm restraint 212 including a latch 216 is illustrated in accordance with various embodiments. In various embodiments, arm restraint assembly 100, with momentary reference to FIG. 6, may include an arm restraint 212 in place of left arm restraint 112 and in place of right arm restraint 114.

Arm restraint 212 includes a primary arm 220 and a secondary arm 230. Primary arm 220 is coupled to a primary arm bracket 222. Primary arm 220 is configured to rotate about a primary arm pivot joint 224. Secondary arm 230 is coupled to a second arm bracket 232. Secondary arm 230 is configured to rotate about a secondary arm pivot joint 234. In various embodiments, arm restraint 212 may include a lock assembly 225, similar to lock assembly 125 in FIG. 2A. Lock assembly 225 is configured to limit a rotation of primary arm 220.

Arm restraint 212 may further include a netting, similar to netting 210 in FIG. 6. The netting may be coupled to primary arm 220. As primary arm 220 rotates about primary arm pivot joint 224, the netting may be drawn out a net cover, similar to net cover 150 in FIG. 6. In various embodiments, a portion of the netting may be coupled to secondary arm 230. As primary arm 220 rotates about primary arm pivot joint 224, the netting may force secondary arm 230 to rotate about secondary arm pivot joint 234.

Arm restraint 212 includes a latch 216. Latch 216 is rotationally coupled to primary arm 220 via a latch pivot joint 218. Latch 216 may rotate, relative to primary arm 220, via latch pivot joint 218. Latch 216 includes legs 226 and a hook portion 228, similar to latch 160 in FIG. 2A.

In various embodiments, a primary shear pin 240 may be coupled to latch 216. In various embodiments, primary shear pin 240 may extend between a first pair of lugs 242 of latch 216. Stated differently, primary shear pin 240 may be coupled to a first primary lug and a second primary lug of latch 216. In various embodiments, the first pair of lugs 242 extend from a surface 244 of latch 216.

In various embodiments, a coupling 250 may couple a lanyard 252 to primary shear pin 240 and latch 216. In various embodiments, coupling 250 may be located between primary shear pin 240 and surface 244 of latch 216 and through a loop 262 defined by an end 264 of lanyard 252. Stated differently, in various embodiments, coupling 250 may comprise a ring, and primary shear pin 240 and end 264 of lanyard 252 may be located within a loop 266 defined by the ring.

In various embodiments, lanyard 252 may be attached to an anchor 254. With combined reference to FIG. 1A and FIG. 7, an anchor, or a coupling, 254 is coupled or otherwise attached to a stationary structure (e.g., a seat rail, a wall, a floor, etc.) within cockpit 18. In this regard, during expulsion of ejection seat 14 from cockpit 18, ejection seat 14 translates toward canopy 22 (i.e., in the direction of arrow 260), while anchor 254 remains stationary. As ejection seat 14 travels toward canopy 22, the coupling of lanyard 252 to latch 216 and to anchor 254 causes latch 216 to rotate about latch pivot joint 218.

Latch 216 rotates about latch pivot joint 218 until legs 226 contact primary arm 220. The interference between legs 226 and primary arm 220 causes primary arm 220 to rotate about primary arm pivot joint 224. Primary arm 220 is configured to rotate to a fully deployed position (i.e., a predetermined number of degrees), wherein lock assembly 225 engages and prevents further rotation of primary arm 220. As the ejection seat continues to translate in the direction of arrow 260 (i.e., away from anchor 254), the load applied to primary shear pin 240 by lanyard 252 increases due to the rotation of primary arm 220 being restricted by lock assembly 225. The load applied by lanyard 252 will continue to increase until the load exceeds the minimum load of primary shear pin 240, at which point primary shear pin 240 will break, thereby releasing (i.e., uncoupling) latch 216 and primary arm 220 from lanyard 252 and anchor 254.

The configuration of latch 216 and primary shear pin 240 may allow arm restraint 212 to fully deploy quickly and easily within cockpit 18. Deploying arm restraint 212 within cockpit 18 increases a probability that arm restraint 212 will be available to support and restrain the arms of occupant 16 when entering windblast.

Figure 8:
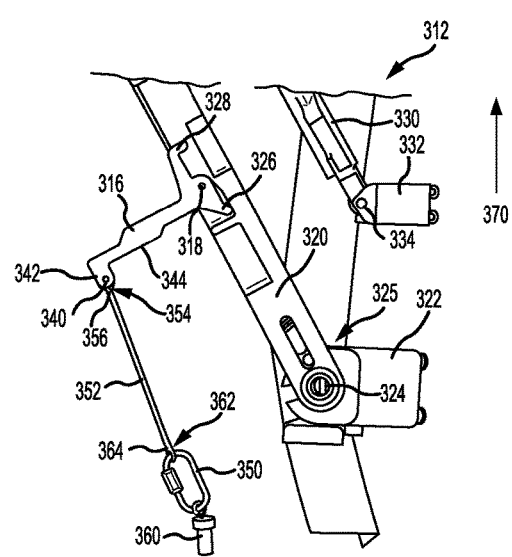
FIG. 8 illustrates an arm restraint in a partially-deployed state with a coupling attached between a lanyard and an anchor, in accordance with various embodiments.

With reference to FIG. 8, an arm restraint 312 including a latch 316 is illustrated in accordance with various embodiments. In various embodiments, arm restraint assembly 100, with momentary reference to FIG. 6, may include an arm restraint 312 in place of left arm restraint 112 and in place of right arm restraint 114.

Arm restraint 312 includes a primary arm 320 and a secondary arm 330. Primary arm 320 is coupled to a primary arm bracket 322. Primary arm 320 is configured to rotate about a primary arm pivot joint 324. Secondary arm 330 is coupled to a second arm bracket 332. Secondary arm 330 is configured to rotate about a secondary arm pivot joint 334. In various embodiments, arm restraint 312 may include a lock assembly 325, similar to lock assembly 125 in FIG. 2A. Lock assembly 325 is configured to limit a rotation of primary arm 320.

Arm restraint 312 may further include a netting, similar to netting 210 in FIG. 6. The netting may be coupled to primary arm 320. As primary arm 320 rotates about primary arm pivot joint 324, the netting may be drawn out a net cover, similar to net cover 150 in FIG. 6. In various embodiments, a portion of the netting may be coupled to secondary arm 330. As primary arm 320 rotates about primary arm pivot joint 324, the netting may force secondary arm 330 to rotate about secondary arm pivot joint 334.

Arm restraint 312 includes a latch 316. Latch 316 is rotationally coupled to primary arm 320 via a latch pivot joint 318. Latch 316 may rotate, relative to primary arm 320, via latch pivot joint 318. Latch 316 includes legs 326 and a hook portion 328, similar to latch 160 in FIG. 2A.

In various embodiments, a primary shear pin 340 may be coupled to latch 316. In various embodiments, primary shear pin 340 may extend between a first pair of lugs 342 of latch 316. Stated differently, primary shear pin 340 may be coupled to a first primary lug and a second primary lug of latch 316. In various embodiments, the first pair of lugs 342 extend from a surface 344 of latch 316.

In various embodiments, a lanyard 352 may be coupled to primary shear pin 340 and latch 316. In various embodiments, primary shear pin 340 may be located through a loop 354 defined by a first end 356 of lanyard 352. A coupling 350 may couple lanyard 352 to an anchor, or a coupling, 360. In various embodiments, coupling 350 may be located through a second loop 362 defined by a second end 364 of lanyard 352. In various embodiments, coupling 350 may comprise a ring configured to couple to anchor 360 and second end 364 of lanyard 352.

With combined reference to FIG. 1A and FIG. 8, anchor 360 is coupled or otherwise attached to a stationary structure (e.g., a seat rail, a wall, a floor, etc.) within cockpit 18. In this regard, during expulsion of ejection seat 14 from cockpit 18, ejection seat 14 translates toward canopy 22 (i.e., in the direction of arrow 370), while anchor 360 remains stationary. As ejection seat 14 travels toward canopy 22, the coupling of lanyard 352 to latch 316 and to anchor 360 causes latch 316 to rotate about latch pivot joint 318.

Latch 316 rotates about latch pivot joint 318 until legs 326 contact primary arm 320. The interference between legs 326 and primary arm 320 causes primary arm 320 to rotate about primary arm pivot joint 324. Primary arm 320 is configured to rotate to a fully deployed position (i.e., a predetermined number of degrees), wherein lock assembly 325 engages and prevents further rotation of primary arm 320. As the ejection seat continues to translate in the direction of arrow 370 (i.e., away from anchor 360), the load applied to primary shear pin 340 by lanyard 352 increases due to the rotation of primary arm 320 being restricted by lock assembly 325. The load applied by lanyard 352 will continue to increase until the load exceeds the minimum load of primary shear pin 340, at which point primary shear pin 340 will break, thereby releasing (i.e., uncoupling) latch 316 and primary arm 320 from lanyard 352 and anchor 360.

The configuration of latch 316 and primary shear pin 340 may allow arm restraint 312 to fully deploy quickly and easily within cockpit 18. Deploying arm restraint 312 within cockpit 18 increases a probability that arm restraint 312 will be available to support and restrain the arms of occupant 16 when entering windblast.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An arm restraint assembly for an ejection seat, comprising:
   a primary arm configured to pivot about a primary arm pivot joint;
   a latch coupled to the primary arm, the latch comprising a first pair of lugs, wherein the latch is configured to pivot relative to the primary arm;
   a primary shear pin extending between the first pair of lugs; and
   a lanyard coupled to the primary shear pin.

2. The arm restraint assembly of claim 1, further comprising a netting coupled to the primary arm.

3. The arm restraint assembly of claim 2, further comprising a secondary arm coupled to the netting, the secondary arm being configured to pivot about a secondary arm pivot joint.

4. The arm restraint assembly of claim 3, wherein the secondary arm defines a secondary orifice, and wherein in a non-deployed position a hook portion of the latch is located through the secondary orifice.

5. The arm restraint assembly of claim 1, further comprising a secondary shear pin coupled to a second pair of lugs of the latch.

6. The arm restraint assembly of claim 5, wherein the secondary shear pin is designed to shear at a first minimum shear load, and wherein the primary shear pin is designed to shear at a second minimum shear load, the second minimum shear load being greater than the first minimum shear load.

7. The arm restraint assembly of claim 1, further comprising a lock assembly coupled to the primary arm, wherein the lock assembly is configured to restrict rotation of the primary arm.

8. The arm restraint assembly of claim 7, further comprising a primary arm bracket coupled to the primary arm, wherein the lock assembly comprises a tab coupled to the primary arm and biased toward the primary arm bracket, and wherein the primary arm bracket defines a groove configured to receive the tab in response to the primary arm rotating a predetermined number of degrees.

9. An ejection seat, comprising:
   a seat back; and
   an arm restraint assembly coupled to the seat back, the arm restraint assembly comprising:
      a primary arm configured to pivot relative to the seat back;
      a latch coupled to the primary arm, the latch comprising a first pair of lugs;
      a primary shear pin extending between the first pair of lugs; and
      a lanyard coupled to the primary shear pin.

10. The ejection seat of claim 9, wherein the arm restraint assembly further comprises a secondary arm, wherein in a non-deployed position the secondary arm is located between the primary arm and the seat back.

11. The ejection seat of claim 10, wherein the secondary arm defines a secondary orifice, and wherein in the non-deployed position a portion of the latch is located through the secondary orifice.

12. The ejection seat of claim 9, wherein the arm restraint assembly further comprises a secondary shear pin extending between a second pair of lugs of the latch.

13. The ejection seat of claim 12, wherein the second pair of lugs extends from a surface of the latch, and wherein in a non-deployed position the lanyard is located between the secondary shear pin and the surface of the latch.

14. The ejection seat of claim 9, wherein the latch further comprises a leg configured to limit a rotation of the latch relative to the primary arm.

15. The ejection seat of claim 9, wherein the arm restraint assembly further comprises a lock assembly coupled to the primary arm, wherein the lock assembly is configured to restrict rotation of the primary arm.

16. The ejection seat of claim 15, wherein the arm restraint assembly further comprises a primary arm bracket coupled to the primary arm, and wherein the lock assembly comprises a tab coupled to the primary arm, and wherein the primary arm bracket defines a groove configured to receive the tab in response to the primary arm rotating a predetermined number of degrees.

17. An arm restraint assembly configured to deploy in response to expulsion of an ejection seat from a cockpit, the arm restraint assembly comprising:
  a left arm restraint and a right arm restraint, wherein the left arm restraint and the right arm restraint each comprise:
    a primary arm configured to pivot to a fully-deployed position within the cockpit;
    a latch coupled to the primary arm, the latch comprising a first pair of lugs; and
    a primary shear pin extending between the first pair of lugs.

18. The arm restraint assembly of claim 17, wherein the left arm restraint and the right arm restraint each further comprise a lanyard coupled to the primary shear pin.

19. The arm restraint assembly of claim 17, wherein the left arm restraint and the right arm restraint each further comprise a secondary shear pin extending between a second pair of lugs of the latch.

20. The arm restraint assembly of claim 17, wherein the left arm restraint and the right arm restraint each further comprise a secondary arm, and wherein in a non-deployed position a portion of the latch is located through a secondary orifice defined by the secondary arm.

* * * * *